United States Patent
Johnson et al.

(10) Patent No.: US 8,689,527 B2
(45) Date of Patent: Apr. 8, 2014

(54) HARVEST AID MACHINE

(75) Inventors: Robert Johnson, Watsonville, CA (US); Manuel Mercado, Watsonville, CA (US); Gary Grossen, Gervais, OR (US); Jeff Mathews, Fremont, CA (US); Michael Christensen, Camarillo, CA (US)

(73) Assignee: Reiter Affiliated Companies, LLC, Oxnard, CA (US)

( * ) Notice: Subject to any disclaimer, the term of this patent is extended or adjusted under 35 U.S.C. 154(b) by 302 days.

(21) Appl. No.: 12/813,725

(22) Filed: Jun. 11, 2010

(65) Prior Publication Data

US 2011/0088363 A1 Apr. 21, 2011

Related U.S. Application Data

(60) Provisional application No. 61/186,677, filed on Jun. 12, 2009.

(51) Int. Cl.
*B65B 25/04* (2006.01)
*B65B 67/02* (2006.01)
*A01D 46/00* (2006.01)
*A01B 75/00* (2006.01)

(52) U.S. Cl.
CPC ............... *B65B 25/04* (2013.01); *B65B 67/02* (2013.01); *A01D 46/00* (2013.01); *A01B 75/00* (2013.01)
USPC .............................. 53/391; 280/32.5; 414/508

(58) Field of Classification Search
CPC ..... A01B 75/00; A01D 46/243; A01D 46/00; B65B 67/02; B65B 67/00; B65B 25/04
USPC ............ 53/390, 391; 414/508; 280/32.5, 209, 280/215

IPC ............ B65B 67/00; A01D 46/00; A01B 75/00
See application file for complete search history.

(56) References Cited

U.S. PATENT DOCUMENTS 223,468 A 1/1880 Benthall
1,756,803 A 4/1930 Williams
(Continued)

FOREIGN PATENT DOCUMENTS

FR 2550049 A1 * 2/1985 ............. A01B 75/00
FR 2872675 A1 * 1/2006 ............. A01D 46/00
(Continued)

OTHER PUBLICATIONS

Oxnard Mechanical Strawberry Harvest Begins, Ag Accent—Newsletter (Agric. Action Comm., Clovis, CA), Jan. 15, 2008, http://www.fels.org/AgAccent/0801AgAccent.htm, [last accessed Feb. 14, 2011], 4 pages.

(Continued)

*Primary Examiner* — Stephen F Gerrity
(74) *Attorney, Agent, or Firm* — Amster, Rothstein & Ebenstein LLP

(57) ABSTRACT

A harvest aid machine and method of use is provided comprising a self-powered vehicle having a main chassis upon which a crate storage unit may be mounted. The harvest aid machine has improved maneuverability and may have a near zero-point turning radius. Crate storage unit may comprise a platform for receiving packed crates and a second platform for receiving empty crates. Alternatively, crate storage unit may include a chute assembly for receiving empty crates and/or a roller table for receiving packed crates. A harvest aid machine may further include harvest modules that may be removably mounted to a main chassis and are width-adjustable such that the harvest modules are adaptable to different crop row spacing, and optionally different crate sizes.

25 Claims, 7 Drawing Sheets

(56) References Cited

U.S. PATENT DOCUMENTS

| | | | |
|---|---|---|---|
| 2,095,007 A | | 10/1937 | Pfister |
| 2,163,851 A | | 6/1939 | Pfister |
| 2,165,551 A | | 7/1939 | Iverson |
| 2,395,124 A | * | 2/1946 | Jelderks .......................... 53/391 |
| 2,473,587 A | * | 6/1949 | Huston ........................... 53/391 |
| 2,523,832 A | * | 9/1950 | Kunkel ....................... 280/32.5 |
| 2,590,965 A | | 4/1952 | Huston |
| 2,676,446 A | | 4/1954 | Johnson |
| 2,699,877 A | * | 1/1955 | Huston ........................... 53/391 |
| 2,701,022 A | * | 2/1955 | Chestnutt .................... 280/32.5 |
| 2,804,739 A | * | 9/1957 | Martin ............................ 53/391 |
| 2,825,573 A | | 3/1958 | Shaw et al. |
| 2,833,100 A | * | 5/1958 | Correia .......................... 53/391 |
| 2,861,703 A | | 11/1958 | Imazimi et al. |
| 3,033,303 A | * | 5/1962 | Weekly ....................... 280/32.5 |
| 3,037,570 A | | 6/1962 | Olson |
| 3,090,457 A | | 5/1963 | Amick |
| 3,351,151 A | | 11/1967 | Miller, Jr. et al. |
| 3,724,168 A | * | 4/1973 | Cassady, Jr. et al. ........... 53/391 |
| 3,825,087 A | | 7/1974 | Wilson |
| 3,827,446 A | | 8/1974 | Honeycutt |
| 3,990,217 A | * | 11/1976 | Aoyama ............................ 56/1 |
| 4,073,392 A | * | 2/1978 | Dibler et al. .................. 414/508 |
| 4,206,812 A | | 6/1980 | Viel |
| 4,234,203 A | * | 11/1980 | Johnson ....................... 280/32.5 |
| 4,292,784 A | * | 10/1981 | Abatti et al. .................... 53/391 |
| 4,395,186 A | | 7/1983 | Whyte |
| 4,557,368 A | | 12/1985 | Alameda |
| 4,590,739 A | * | 5/1986 | Abatti et al. .................... 53/391 |
| 4,616,468 A | | 10/1986 | Munoz |
| 4,655,667 A | | 4/1987 | Plumb et al. |
| 4,736,574 A | | 4/1988 | Walker |
| 4,876,844 A | | 10/1989 | Grey |
| 4,884,388 A | * | 12/1989 | Ventura et al. .................. 53/390 |
| 5,152,129 A | | 10/1992 | McKenna, Jr. |
| 5,218,812 A | * | 6/1993 | Ventura et al. .................. 53/391 |
| 5,322,409 A | * | 6/1994 | McCluney ................... 280/32.5 |
| 5,450,716 A | | 9/1995 | Gidge |
| 6,758,317 B1 | | 7/2004 | Colby |
| 7,377,091 B2 | | 5/2008 | Shelton et al. |
| 2004/0139692 A1 | * | 7/2004 | Jacobsen et al. ................ 53/391 |
| 2004/0172920 A1 | * | 9/2004 | Garcia, Sr. et al. ............. 53/391 |
| 2005/0126144 A1 | | 6/2005 | Koselka et al. |
| 2006/0127207 A1 | * | 6/2006 | Corbett ......................... 414/508 |
| 2006/0150602 A1 | * | 7/2006 | Stimmann ...................... 56/10.5 |
| 2007/0113531 A1 | * | 5/2007 | Maconachy et al. ........... 56/13.9 |
| 2008/0010961 A1 | | 1/2008 | Gray |
| 2008/0047475 A1 | * | 2/2008 | Stehling et al. ................. 111/69 |
| 2008/0245042 A1 | | 10/2008 | Brunnert et al. |

FOREIGN PATENT DOCUMENTS

| | | | | | |
|---|---|---|---|---|---|
| GB | 2334192 A | * | 8/1999 | ............. | A01D 46/00 |
| JP | 09-224418 A1 | * | 9/1997 | ............. | A01D 46/00 |
| JP | 11-9011 | * | 1/1999 | ............. | A01B 69/00 |

OTHER PUBLICATIONS

Ramsay Highlander, Inc., Field Pack Harvesting Aids, http://www.ramsayhighlander.com/products/field-pack/harvesting-aid.htm, [last accessed Feb. 14, 2011], 1 page.

Naber's Ag Equipment, LLC., http://www.nabersequipment.com/index.html, [last accessed Feb. 14, 2011], 2 pages.

Pam Fisher et al., Highlights of the Oxnard Tour, Feb. 12, 2007, The Ontario Berry Grower (Ministry of Agric. Food & Rural Affairs, Ontario, CA), Jul. 2007, at 3, http://www.omafra.gov.on.ca/english/crops/hort/news/allontario/ao0407.pdf, [last accessed Feb. 14, 2011], 9 pages.

Fred Alvarez, Field Machine Dispute Crops Up, L.A. Times, Jun. 1, 2003, at B-1, http://articles.latimes.com/2003/jun/01/local/me-labor1, [last accessed Feb. 14, 2011], 1 page.

Manzanita Berry Farms, Update on Machine Assisted Harvest, Berry News, Santa Maria, CA, Mar. 15, 2005, http://berries4u.com/news.htm, [last accessed Feb. 14, 2011], 2 pages.

Naber's Ag Equipment, LLC., EasyPick 400 Series Harvest Assistant, http://nabersequipment.com/400serieseasypick.htm, [last accessed Feb. 14, 2011], 2 pages.

Lisa Kitinoja et al., Small-Scale Postharvest Handling Practices: A Manual for Horticultural Crops (4th Edition), Post-harvest Horticulture Series No. 8E, (Jul. 2002, slightly revised in Nov. 2003), http://www.fao.org/docrep/009/ae075e/ae075e00.htm, [last accessed Feb. 14, 2011], 261 pages.

Howard R. Rosenberg, Many Fewer Steps for Pickers—A Leap for Harvestkind?, Choices Magazine (May 2004), http://www.choicesmagazine.org/2004-1/2004-1-02.htm, [last accessed Feb. 14, 2011], 8 pages.

Naber's Ag Equipment, LLC., EasyPick Harvest Assistant, http://www.nabersequipment.com/2easypick.htm, [last accessed Feb. 14, 2011], 5 pages.

Ahmed M. Hussen et al., Estimated Costs and Returns from Mechanical Strawberry Harvest in Oregon: A Progress Report, Special Report No. 556 (Jun. 1979), 32 pages.

Howard R. Rosenberg, Adjusting to Technological Change in Strawberry Harvest Work, Giannini Foundation of Agricultural Economics (2003), 4 pages.

* cited by examiner

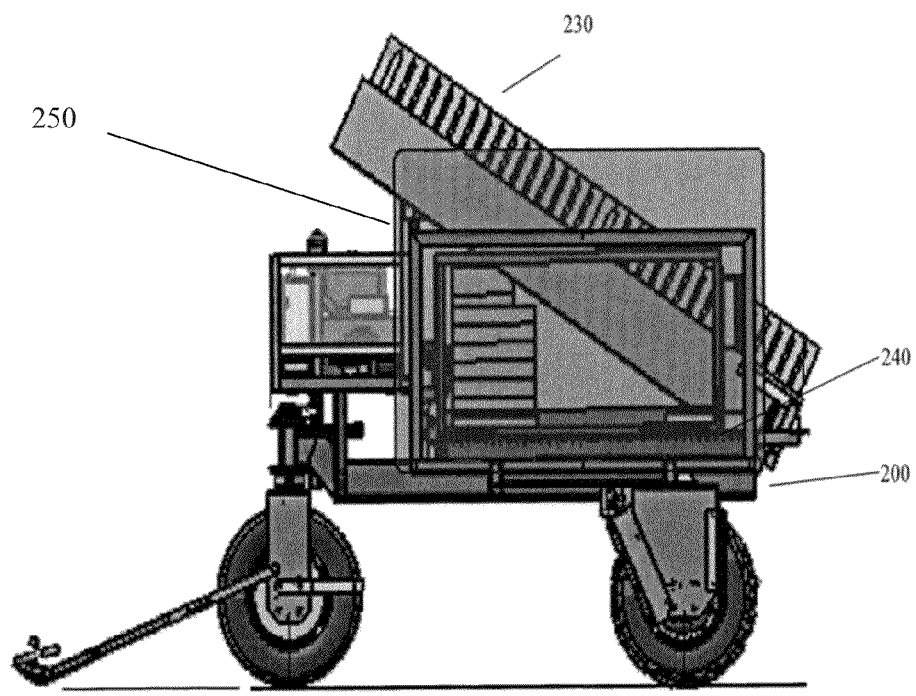

US 8,689,527 B2

HARVEST AID MACHINE

CROSS REFERENCE TO RELATED APPLICATIONS

This application claims priority to U.S. Provisional App. No. 61/186,677, filed on Jun. 12, 2009, the contents of which are hereby incorporated by reference in its entirety.

FIELD OF INVENTION

This invention is in the field of harvest aid machines, and more particularly harvest aid machines adapted to aid the worker performing the harvest of low-lying crops, and even more particularly harvest aid machines further adapted with harvest modules which are readily scalable to production levels and field design.

BACKGROUND

Harvest aid machines are known for assisting workers in the harvesting of field crops. For example, U.S. Pat. No. 2,095,007 discloses an apparatus that is adapted to travel under its own power through a field of growing corn such that a number of workers are supported by the apparatus in a position ideal for the laborer to simultaneously harvest corn tassels from a plurality of rows of corn. Further, related U.S. Pat. No. 2,163,851 discloses that such apparatus can be further adapted for rear-wheel drive. However, such disclosed apparatus is not adequate for other crops because of the differences in the height of the crop, robustness of the crop to handling, ease of actual harvesting of the crop's fruit, field growing conditions, weather, etc. Low-lying crops, such as strawberries, for example, present concerns greatly different from that of robust field crops, for example, differences may include size and positioning of the fruit on the planting surface, packing of fruit directly into consumer packaging in the crop field as it is picked, the quantity of fruit harvested per linear foot of plants, delicate nature of the crop and the fact that some fruits, like berries, are rapidly perishable.

Low-lying crops, such as strawberries, are typically expensive to harvest because of the extensive and intensive manual labor involved. Typically, strawberry harvesting requires the worker to remain in a bent, hunched, crouched, or stooped position for extended periods of time as they inspect and harvest the low-lying strawberry fruit. Consequently, harvest aid machines have been specifically adapted and modified for assisting workers in the harvest of low-lying berries. For example, U.S. Pat. No. 1,756,803 discloses an apparatus that supports workers in a seated-position for harvesting the berries and further discloses that a canopy is arranged above the workers for sun protection. Similarly, U.S. Pat. No. 3,351,151 also discloses a canopied apparatus which supports workers in a seated-position for harvesting the berries and further discloses that the apparatus is self-propelled.

Strawberries are also delicate and require the proper care and handling so as to eliminate destruction of the individual plants and harvested fruit. Thus, specific to delicate berry crops, harvesting aid machines has been adapted to provide convenient access to various packaging supplies such that the harvested strawberry fruit can be stored, packaged and ready for transport to customers. For example, U.S. Pat. No. 3,351, 151 provides that its disclosed apparatus can be adapted to carry containers into which the harvested crop can be placed. Other patent solutions, such as those disclosed by U.S. Pat. Nos. 3,825,087 and 4,616,468, involve large, bulky carrier-type vehicles in which the frame supports a large platform that is capable of supporting not only packaging containers, but also supporting diverse farm implements and attachments such as sprayers, planters, tanks, chemicals, etc.

Commercial strawberry growers that have used harvesting aids have done so with varying success. For example, the Harvest Pro is a commercially-available mechanical harvest aid machine which precedes the workers across the berry patch, carrying containers and pallets of the harvested strawberry fruit. The Harvest Pro operates on a diesel engine and has fully articulated wheels such that its wheels can move the machine in four directions without having to turn the entire machine around. U.S. Pat. No. 6,758,317 appears to disclose a mechanical harvest aid machine that is similar in operation to the Harvest Pro.

Another example of a commercially-available harvest aid machine is the Field Pack Harvesting Aid, which like the Harvest Pro, is adaptable to conveyor systems where the harvested strawberry fruit can be placed and conveyed through an optional wash tank or spray chamber, then packed by size and weight, then loaded to a transport trailer. The Field Pack Harvesting Aid includes convenient features like night harvest lights, a canopy shelter, and sliding axles for aligning to the planting rows.

A smaller, less-sophisticated commercially-available harvest aid machine is the EasyPick Harvest Assistant which does not include any conveyor system but still offers some of the conveniences of the Harvest Pro or Field Pack Harvesting Aid.

While each of these prior art apparatus and commercial products offer the advantages of reducing workplace injury and increasing efficiency, they also have several disadvantages in that they tend to be very expensive to build or purchase, they are often bulky machines that are best-suited for operation in dry weather and square fields having no ditches, and they tend to require large acreage for efficient maneuvering and operation. Additional disadvantages may include lower productivity for workers positioned in a seated or lying picking position as compared to workers working with their feet on the ground such as in a bent, hunched, crouched, or stooped position.

One particular problem associated with the prior art harvest aid machines is that they are often large, bulky machines spanning across over a dozen or more crop rows resulting in increased turning radius and increased operating acreage. Another problem with the prior art harvest aid machines is that the smaller, more-compact designs, as compared to the Harvest Pro, often lack adequate storage space for crates and medical supplies. A further problem is that the more-compact designs, as compared to the Harvest Pro, also lack the capability of being readily scalable to increased production levels or different field designs.

Additional problems with large, bulky machines may include the inability to effectively operate in muddy conditions. Large, bulky machines may also require a dedicated driver, thus, increasing costs. Large, bulky machines are mechanically complex requiring specially trained operators and mechanics to operate and perform maintenance. Large, bulky machines may also reduce worker productivity in that the crews working with the large, bulky machines are typically staffed with 15 or more workers which has the added disadvantage of reduced team efficiency. For example, in a crew of 15 or more workers, the faster workers will be required to wait for slower workers and vice versa. Thus, it is advantageous to have a smaller number of workers assigned to a single harvest aid machine.

Accordingly, what is needed is a harvest aid machine that is less bulky, better-suited for all-weather conditions, field designs, and can efficiently maneuver and operate in reduced acreage. A harvest aid machine that can be readily scaled to differing production levels and field designs is also needed. A harvest aid machine that increases or stabilizes crew productivity and worker efficiency. The present invention provides these needs and others not specifically mentioned above but described in the sections to follow.

SUMMARY OF INVENTION

An improved harvest aid machine according to an exemplary embodiment of the invention comprising a self-powered vehicle having a main chassis. Crate storage units may be mounted to the main chassis. In one embodiment, the crate storage unit consists of at least a platform design having at least one platform, or a portion thereof, for receiving crates which have been packed with the harvested crop and a second platform, or a portion thereof, for receiving empty crates. Optionally, at least one platform may include a roller table for receiving packed crates.

In another embodiment, the crate storage unit may include a chute assembly for dispensing of empty crates. The crate storage unit may be further adapted to include a roller table for receiving packed crates. The roller table may be further adapted with control systems, for example friction brakes or levers, for controlling crate movement.

In still another embodiment, at least two harvest modules may be removably mounted to the main chassis. The modular crate storage units may be mounted with a universal, single-sided wheel stanchion. The modular crate storage units may also be width adjustable such that they can be adapted to different crop row spacing or crate sizes. For example, the modular crate storage can be readily adapted to handle 52" crop row spacings, 64" crop row spacings, 68" crop row spacing, etc. The 52", 64" and 68" spacing refers to the distance between the centers of the planting beds.

An object of the invention is to provide an improved harvesting aid machine adapted for improved maneuverability. It is a further object of the invention to provide an improved harvesting aid machine with a near zero-point turning radius.

BRIEF DESCRIPTION OF DRAWINGS

FIG. 2b is a side view of a second embodiment of an improved harvesting aid machine.

DETAILED DESCRIPTION

Figure 1:
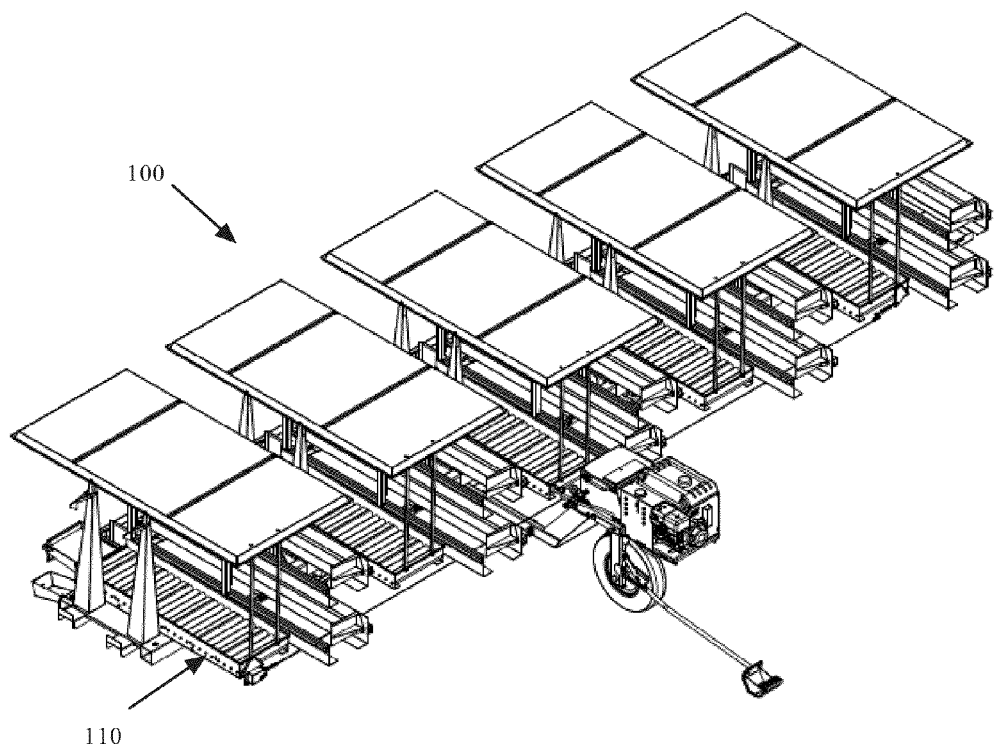
FIG. 1 is a perspective view from the front side of a first embodiment of an improved harvesting aid machine.

FIG. 1 illustrates a harvest aid machine 100 of one embodiment of the present invention. Machine 100 is self-powered vehicle having a main chassis 110. At least one platform may be mounted to the main chassis 110 of machine 100. In an exemplary embodiment, at least one platform for receiving and storing crates which have been packed with the harvested crop is provided, and optionally a second platform may be provided for storing empty crates. The platform may be designed in sections such that a single platform may include a portion for receiving packed crates and a portion for storing empty crates. In an exemplary embodiment, a bi-level platform is mounted to the main chassis of machine 100 such that the lower-level platform is used for receiving packed crates and the upper-level platform is used for storing empty crates. Of course, the bi-level platform may be readily sectioned and configured for providing additional storage areas, for example, a storage area for harvesting implements, emergency supplies, refreshing station, etc.

Figure 2A:
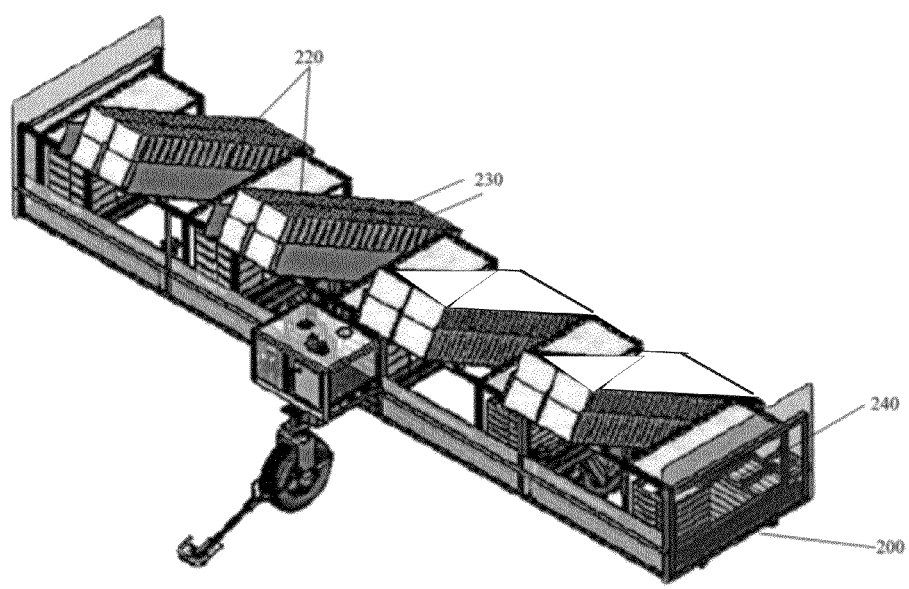
FIG. 2a is a perspective view from the front side of a second embodiment of an improved harvesting aid machine.

FIGS. 2A and 2B illustrate a harvest aid machine 200 of a second embodiment of the present invention. In an exemplary embodiment, a crate storage unit 220 may be provided in which empty crates are gravity-dispensed. In an exemplary embodiment, crate storage unit 220 includes chute assembly 230 for storage of empty crates. The dimensioning of the chute assembly 230 may be configured in adjustable sections for storing 52", 64" and 68" crates.

Crate storage unit 220 may be further adapted for receiving packed crates. In an exemplary embodiment, crate storage unit 220 includes a roller table 240 for receiving packed crates. The roller table 240 is secured to the chassis at the rear side of the machine and to a hydraulic cylinder 250 at a location proximate to the front side of the machine 200. The default position of the roller table 240 is sloped from the rear side of the machine towards the front side of the machine such that the roller table 240 is relatively higher off the ground at the rear side of the machine. Utilizing this particular configuration allows for the gravity assisted loading of full crates. Once full crates have been loaded, hydraulic cylinder 250 is vertically extended, thereby causing the slope of the roller table to change such that the roller table is relatively higher off the ground at the front side of the machine 200. By using the hydraulic cylinder 250 to reconfigure the slope of the roller table 240 in this manner, gravity assistance can be used to unload full crates from the rear side of the machine. This system allows for a reduction in the amount of energy expended by the worker when packing crates by allowing the worker to use gravity assistance to both load and offload full crates from the rear side of the machine.

Figure 3A:
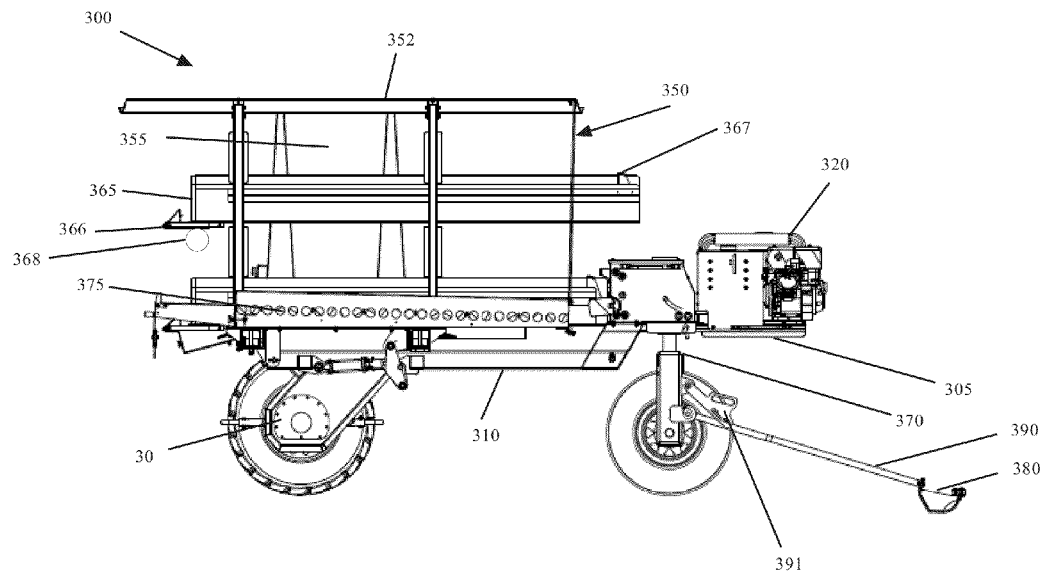
FIGS. 3A and 3B are side views of an improved harvesting aid machine according to another exemplary embodiment of the present invention.
Figure 3B:
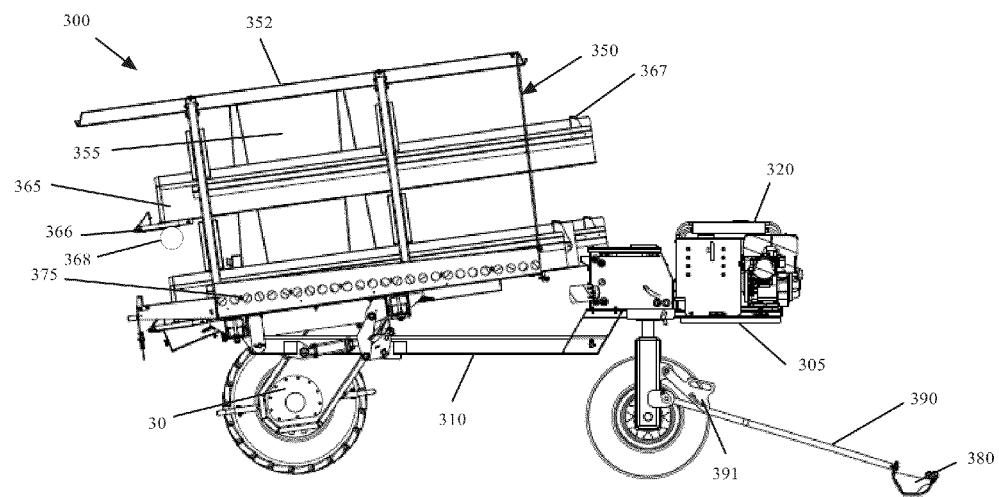
Figure 4:
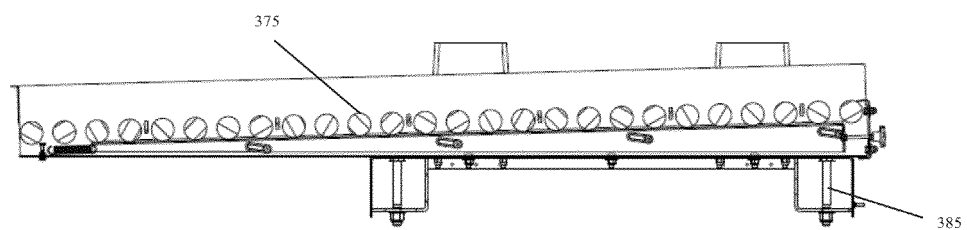
FIG. 4 is a side view of a full crate storage roller table of the harvesting aid machine of FIGS. 3A and 3B.
Figure 5:
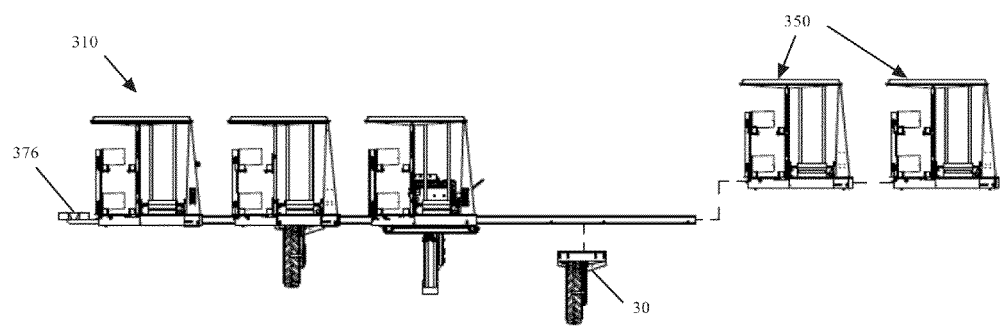
FIG. 5 is a back view of the harvesting aid machine of FIGS. 3A and 3B showing the spacing of the wheels being laterally adjustable.
Figure 6:
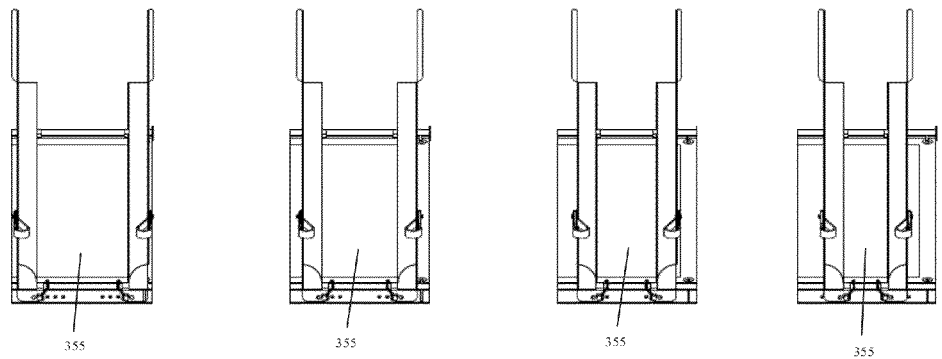
FIG. 6 is a top view of the harvesting aid machine of FIGS. 3A and 3B showing the width of the empty crate storage chute being adjustable.
Figure 7:
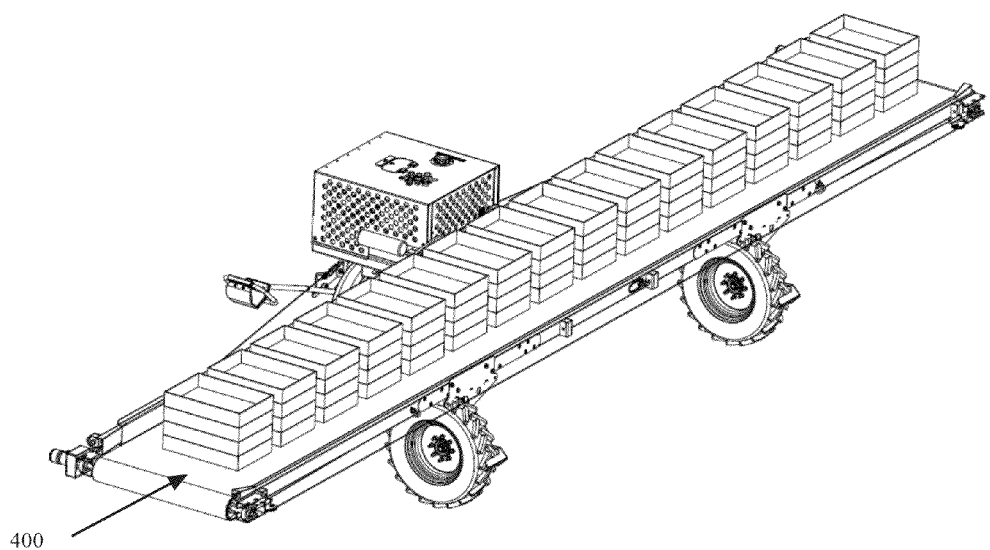
FIG. 7 is a perspective view of a conveyor system useable with the harvesting aid machine of FIGS. 3A and 3B.

FIG. 3 illustrates harvest aid machine 300 of the present invention in a crop field. Machine 300 is a self-powered vehicle using, for example, a gas engine 320 turning a hydrostatic hydraulic pump. A number of workers work on a loading side 305 of machine 300. Machine 300 includes a main chassis 310 onto which harvest modules 350 can be mounted. Machine 300 may include one or more propelled wheels. Machine 300 may also include one or more non-propelled wheels used for steering Harvest modules 350 may be mounted with universal, single-sided wheel stanchion 30, which may enclose hydraulic motors, turn sprockets, chains, etc., or any combination thereof, of the wheel assembly. Wheel stanchion 30 may house one or more propelled wheels. In an exemplary embodiment, wheel stanchion 30 is a universal, single sided drive leg that is extra narrow with, for example, a 4:1 gear reduction. The single sided design permits easier access and maintenance, such as changing a tire. Wheel stanchion 30 may also include a sealed oil bath design to keep internal components free of mud and grit, and lubricated, for longer operation. A hydraulic manifold may be included with wheel stanchion 30 that integrates all of the hydraulic control functions into a single-unit including a high pressure filter to protect components from small wear particles. A hydraulic manifold may also be located in a sealed box near the gas engine.

Harvest modules 350 may be modular single-units having integrated empty crate storage 355 and feeding mechanisms 365 (system to propel empty crates) and a full crate storage roller table 375. The empty crate storage and feeding mechanisms may also include a spring loaded box retention device 367 allowing for push-in loading with single crate feeding release (singulator 366). The full crate storage roller table 375 receives crates loaded with harvested berries In an exemplary embodiment, packed crates are gravity loaded on the roller table. The full crate storage roller table 375 may be equipped with a load holding brake that allows static travel along with easy unloading. Harvest module 350 may be further adapted to include a pallet storage area and an additional storage area 376 for in-field necessities.

Machine 300 further includes a single-sided front steering leg 370 allowing for easy tire changes. Front steering leg 370 may use a common bearing pivot for rotational durability, ease of maintenance and lowering costs.

Machine 300 optionally includes a single-sided self steering skid 380 permitting machine 300 to track a furrow in the ground, thereby steering itself. Skid 380 includes special material surfaces, such as Teflon plastic, for example, which reduce wear on the arm and allows for easy replacement of worn surfaces. The width of skid 380 is adjustable for varying furrow sizes and depths. Skid arm 390 may include a retainer latch 391 that releasably locks in position when the arm is lifted into an upper range to support the weight for easy hand steering. Retainer latch 391 may also prevent overtravel of the skid arm in the downward direction to protect against sudden drops in the furrow depth.

Hydraulic oil may be carried to wheel stanchion assembly via high pressure hose lines. Harvest modules 350 may include an integrated, durable roof 352 to reflect heat, provide shade and additional protections from inclement weather and other environmental concerns, such as providing shade to the harvested crop, for example.

In an exemplary embodiment, machine 300 includes a main chassis 310 onto which at least two harvest modules 350 are removably mounted. For example, between two and seven modules 350 may be removably mounted on the main chassis 310. In an exemplary embodiment, at least five modules 350 are removably mounted on the main chassis 310. The five modules 350 may be removably mounted on the main chassis 310 by laterally sliding modules 350 along support arms of main chassis 310. Optionally, a harvest module 350 may be inserted into each end of the support arms of main chassis 310 providing machine 300 with seven harvest modules 350.

In an exemplary embodiment, machine 300 of the present invention includes a main chassis 310 onto which five harvest modules 350 are mounted and at least two of the harvest modules 350 having wheel stanchions 30 mounted thereon. Of course, harvest modules 350 may be added or removed to suit production levels.

Machine 300 adapted for use in the harvest of strawberries will now be generally described. Workers may load empty crates into each of the crate storage areas of harvest modules 350. Workers may also load an empty pallet onto the pallet storage rack of harvest module 350. Workers may also load "slip sheets" onto the pallet storage rack. "Slip sheets" are flat pieces of cardboard that are placed between layers of crates on the pallet at specified intervals to help secure the crates together on the pallet. Machine 300 is driven along a headland for insertion into the strawberry patch. Harvest modules 350 are adjusted and spaced according to the planting of the crop row width. In an exemplary embodiment, harvest modules 350 can be moved laterally along main chassis members for performing crop row width adjustments. Modules 350 are readily adjustable to changes in row width spacing, for example 52", 64" and 68", which allows the machine 300 to be used on different farm locations regardless of field design.

Having aligned the harvest modules 350, machine 300 is inserted into the strawberry patch. Machine 300 is optionally controlled via a remote operated by one of the workers or by the front steering bar. Once machine 300 is inserted into the field and the front steering bar has engaged the furrow, the steering bar is placed on the ground by a worker. Workers positions themselves on a loading side 305 of machine 300 to being the picking of strawberry fruit. Workers will follow behind machine 300 as they perform the harvest of the strawberry fruit. Machine 300 includes optional storage areas for first aid kits, medical supplies, lunchbox coolers and watercoolers. Machine 300 further includes a cable trolley inventory control system and a computerized probe for scanning employee information, such as an employee identification number. The use of a computerized probe in connection with the workers daily work routine better enables tracking of, for example, inventory and employee productivity.

Each worker removes an empty crate from the empty crate storage 355 and feeding mechanism 365 and places it on a field transport, for example, a hand cart which carries the crate at a height which is convenient for the worker to pack the strawberries into the crate. With the empty crate on the hand cart the worker begins to pick and pack the strawberry fruit, proceeding down the crop row. Strawberries are typically packed in "clam shells" or baskets, depending on the size of the clamshell or basket, between two and eight clamshells may be fitted into one crate. Generally, clamshells are packed one at a time in the crate. Crates may also come preloaded with empty clamshells or baskets.

Once a crate is full, the worker may transport the full crate back to machine 300, which has been moving forward at a continuous pace similar to the pace at which the worker has been advancing through the field. Workers may typically be positioned 10 to 50 feet behind machine 300 when they fill their crate.

Once the full crate arrives at machine 300, a worker may place the full crate on the full crate storage roller table 375. The roller table is secured to the chassis at the rear side of the machine and to a hydraulic cylinder 385 at a location proximate to the front side of the machine. In its default position, the roller table is sloped from the rear side of the machine towards the front side of the machine such that the roller table is relatively higher off the ground at the rear side of the machine. This slope configuration allows for the gravity-assisted loading of full crates by workers in the field. As used in the field, each worker may be assigned a specific harvest module 350 which may be centered over the crop row that the worker has been assigned. Workers may then build a stack of crates eight high on the roller table before releasing a roller table brake lever, and thereby, cause the crates to move forward on the roller table in order to make room for the next crate stack. Once the roller table has been filled with packed crates, the slope of the roller table may be adjusted using a hydraulic cylinder 385, which vertically extends to cause the slope of the roller table to change such that the roller table becomes relatively higher off the ground at the front side of the machine 300. Accordingly, once the roller table brake is released, gravity will facilitate the movement of the full crates towards the rear side of machine. By using the hydraulic cylinder 385 to reconfigure the slope of the roller table in this manner, gravity assistance can be used to unload full crates from the rear side of the machine. This system allows for a reduction in the amount of energy expended by the worker by enabling the use of gravity to assistance in both the loading and offloading of full crates from the same side of the machine. After one of more full crates is loaded and unloaded from the roller table, a worker may repeat the above cycle.

When machine 300 has accumulated enough fruit to build a pallet, typically 108 crates, machine 300 will stop to unload at the next field crossroad or "headland" that it comes to. Typically crossroads are placed at standard intervals throughout the crop field, perpendicular to the crop rows to facilitate removal of the harvested fruit from the field.

An empty pallet that may have been previously loaded on a pallet storage rack of machine 300 is removed from its storage rack and placed on the crossroad behind the machine. Each worker may then unload the full crates from their assigned harvest module 350. Crates may also be removed in stacks of four by the workers. Workers may place the stacks of four crates on a pallet in a specified orientation. Slip sheets may be removed from machine 300 and positioned on the pallet or full crates at specified intervals.

Alternatively, full crates may be mechanically transferred to a vehicle that is designed to engage the loading side 305 of machine 300, thus, eliminating the need for the workers to manually off load the full crates. The vehicle may then transport the full crates to a centralized area to be palletized.

When a pallet has been completely loaded, workers may reload machine 300 with empty crates. Generally, empty crates are prepositioned along a crossroad.

Machine operator may initiate forward motion of machine 300 to continue across the road, into the next furrow ahead where workers may continue the harvesting cycle. Upon reaching the end of the field, the machine operator may reposition on the front side 315 of machine 300 such that machine 300 can be guided through its turn via the steering handle, and optionally by the remote control. As machine 300 exits the crop rows, a machine operator may initiate a turn on the "headland." In tight spaces on the headland, a machine operator may initiate a tighter turn by engaging the "counter rotate" functionality by moving the steering handle to its maximum turn position. For example, the rear wheel that is at the outside of the turn may continue to rotate forward while the rear wheel at the inside of the turn may rotate in reverse direction. When the turn has been completed, a worker moves the steering handle out of the full turn position. If a less sharp turn is required, a worker may move the handle to a turning position less than full turn. In this intermediate position the rear wheel at the inside of the turn may automatically stop rotating while the rear wheel at the outside of the turn may continue rotating, thus facilitating of the machine but in a wider radius than the counter rotate functionality.

The zero-point turn radius may be achieved using a control computer programmed to allow each of the wheel stanchions 30 to spot turn by counter-rotating in forward and reverse to allow a zero turn radius at the headlands, using less farm ground for roads and more production. Control computer may be operated from a control station attached to machine 300 or optionally remotely controlled. For example, a microprocessor control system with integrated wireless and frequency addressing so that only a remote trained to the receiver can control machine 300. Control station allows machine 300 to pause, forward, emergency stop, move faster, move slower, etc.

Once turned, a worker may align machine 300 with the next set of rows to enter and guides the steering handle into the furrow and places it on the ground to engage the furrow. The machine operator returns to a loading side of machine 300 to continue picking strawberry fruit.

Throughout the field, the operator, who is also picking, can adjust the forward motion and speed of the machine via the remote control to closely match the motion of the machine to the forward progress of the pickers.

After harvest of the crop row has been completed, machine 300 stops at a headland whereby machine 300 changes direction to traverse the headland to the next set of crop rows, change directions in a zero-point turn radius method of the present invention to traverse, again, a set of crop rows, or any combination thereof.

Machine 300 includes a frame tilting system to hold machine 300 in a lowered travel state but still allowing for sufficient tilt to ease unloading of machine 300.

The invention claimed is:

1. A machine for harvesting low-lying crops comprising:
an elongated chassis oriented in a substantially horizontal direction;
two or more harvest modules removably mounted on top of the main chassis; and
two or more of the harvest modules possessing wheels that are driven by a motor,
wherein each of the harvest modules includes an empty crate storage chute containing a plurality of empty crates usable for the harvesting of crops, and
the empty crate storage chute further comprises a system to propel empty crates towards the rear-side of the machine for offloading.

2. The machine of claim 1 wherein the spacing of rear wheels is laterally adjustable by alternating the lateral position of the harvest modules to which each wheel is attached.

3. The machine of claim 1 wherein the main chassis is sloped from the back side of the machine to front side of the machine such that the front-side of the machine is lower in height than the back-side of the machine to enable gravitational forces to assist in loading of crates.

4. The machine of claim 3 further comprising a chassis pivot to alter the slope of the main chassis.

5. The machine of claim 1 wherein the harvest modules are removably mounted by laterally sliding the harvest modules along support arms of the main chassis.

6. The machine of claim 1 wherein the positions of the harvest modules are laterally adjustable along the main chassis.

7. The machine of claim 1 wherein one or more of the harvest modules includes a pallet storage area.

8. The machine of claim 1 wherein one or more of the harvest modules includes a roof.

9. The machine of claim 1 wherein the width of the empty crate storage chute is adjustable to accommodate crates of different widths.

10. The machine of claim 1 wherein the empty crate storage chute includes a singulator located at the rear-side of the machine for dispensing individual crates.

11. The machine of claim 1 wherein the system for offloading empty crates comprises a spring-loaded feeder arm.

12. The machine of claim 11 wherein the system for offloading empty crates further comprises a cable pulley that acts on the spring-loaded feeder arm.

13. The machine of claim 1 wherein each of the harvest modules includes a loading section on which full crates are placed following crop harvesting.

14. The machine of claim 13 wherein each loading section includes a conveyor system oriented in the transverse direction of the machine, capable of transporting a plurality of full crates from one side of the machine to the opposite side of the machine.

15. The machine of claim 14 wherein the conveyor system includes a brake system so that full crates will remain stationary while being loaded onto the machine.

16. The machine of claim 14 wherein the conveyor system comprises a roller table.

17. The machine of claim 1 further comprising additional storage areas for in-field necessities.

18. The machine of claim 17 wherein the in-field necessities include at least one of packaging supplies, harvesting implements, first aid kits, medical supplies, lunchbox coolers, and watercoolers.

19. The machine of claim 1 wherein the motor is a hydraulic motor.

20. The machine of claim 1 wherein the motor is controlled remotely.

21. The machine of claim 1 wherein rear wheels counter-rotate during sharp turns to minimize the machine's turning radius.

22. The machine of claim 1 further comprising a self-steering skid attached to the front side of the machine to allow the machine to steer itself by following a furrow in the ground.

23. The machine of claim 22 wherein the self-steering skid is attached to the front side of the machine by a skid-arm.

24. The machine of claim 23 wherein the skid-arm includes a retainer latch capable of releasably locking the skid-arm in position.

25. A machine for harvesting low-lying crops comprising:
   an elongated chassis oriented in a substantially horizontal direction;
   two or more harvest modules removably mounted on top of the main chassis;
   two or more of the harvest modules possessing wheels that are driven by a motor; and
   a self-steering skid attached to the front side of the machine to allow the machine to steer itself by following a furrow in the ground, wherein
   the self-steering skid is attached to the front side of the machine by a skid-arm and the skid-arm includes a retainer latch capable of releasably locking the skid-arm in position.

\* \* \* \* \*